United States Patent [19]

Sticht

[11] Patent Number: 4,892,180
[45] Date of Patent: Jan. 9, 1990

[54] METHOD AND APPARATUS FOR EXTRACTING INDIVIDUAL PARTS FROM A CONVEYOR

[76] Inventor: Walter Sticht, Karl-Heinrich-Waggerl-Strasse 8, A-4800 Attnang-Puchheim, Austria

[21] Appl. No.: 54,290

[22] Filed: May 26, 1987

Related U.S. Application Data

[63] Continuation-in-part of Ser. No. 804,291, Dec. 3, 1985, abandoned.

[30] Foreign Application Priority Data

Dec. 6, 1984 [AT] Austria .................................. 3869/84

[51] Int. Cl.⁴ ............................................. B65G 47/24
[52] U.S. Cl. ..................................... 198/375; 198/412; 198/468.2
[58] Field of Search ............... 198/463.4, 464.2, 468.2, 198/468.4, 468.5, 468.9, 463.6, 463.5, 339.1, 341, 394, 412, 375; 414/225, 226, 751, 753

[56] References Cited

U.S. PATENT DOCUMENTS

| | | | |
|---|---|---|---|
| 3,084,811 | 4/1963 | Bower | 198/468.4 |
| 4,050,610 | 9/1977 | Sturm | 198/468.2 |
| 4,134,486 | 1/1979 | Grone | 198/341 |
| 4,441,852 | 4/1984 | Dixon | 198/468.2 |
| 4,482,044 | 11/1984 | Redman et al. | 198/394 |
| 4,636,126 | 1/1987 | Spotts | 414/225 |

*Primary Examiner*—Joseph E. Valenza
*Attorney, Agent, or Firm*—Kurt Kelman

[57] ABSTRACT

The invention relates to a method and device for supplying and extracting assembly parts which are fed to an extraction point in a previously determined aligned position. The assembly parts acts upon by a conveying force are carried into a singling and/or extraction position. After this, the assembly part present before the extraction point is held fast, and the assembly part which is to be extracted is grasped in its aligned and guided position. The assembly part grasped is removed from the following assembly parts in the conveying direction and conveyed to a preparation section and/or to a delivery point.

23 Claims, 4 Drawing Sheets

METHOD AND APPARATUS FOR EXTRACTING INDIVIDUAL PARTS FROM A CONVEYOR

CROSS-REFERENCE TO RELATED APPLICATION

This is a continuation-in-part to my copending U.S. patent application Ser. No. 804,291, filed Dec. 3, 1985, now abandoned.

BACKGROUND OF THE INVENTION

1. Field of the Invention

The invention relates to a method and apparatus for supplying and individually extracting assembly parts which are fed to an extraction point in a previously determined aligned position.

2. Description of the Prior Art

Methods and apparatus are known for supplying and extracting assembly parts, which are also referred to as workpiece feed systems, handling systems or manipulator systems. In an apparatus of this kind for supplying and extracting assembly parts—according to U.S. Pat. No. 4,369,872—several rectilinear guiding tracks aligned at an angle to each other are provided, which allow of a displacement of a gripper element or gripper device in three spatial directions. In this apparatus, the assembly part lying closest to the handling apparatus is lifted after infeed from a conveyor pot by a linear conveyor in vertical direction to the conveying plane of the assembly parts, is grasped by the gripper element in the lifted position and deposited on a workpiece which is mounted on a workpiece carrier. This method and this apparatus proved satisfactory in practice. It was found however that not all cases of application can thereby be resolved satisfactorily.

OBJECTS AND SUMMARY OF THE INVENTION

The invention has the object of devising a method and an apparatus of the kind referred to in the foregoing, which simplifies the infeed and extraction of assembly parts and facilitates a troublefree onward conveying of the assembly parts from a feed apparatus to an assembly position on the workpiece.

The above and other objects are accomplished according to one aspect of the invention with a method of feeding a succession of assembly parts to an extraction station and extracting successive ones of the assembly parts at this station, which comprises laterally and vertically guiding the succession of assembly parts at portions thereof in a guiding track for aligning the assembly parts and subjecting the aligned assembly parts in the guiding track to a conveying force to convey the aligned assembly parts in a conveying direction along the guiding track to a singling station defining an end of the guiding track. A respective aligned assembly part immediately trailing a leading assembly part is retained at the singling station and the leading assembly part is grasped by the end of the guiding track at the portion thereof which is laterally and vertically guided. The grasped, vertically and laterally guided assembly part is then moved away from the retained assembly part in the conveying direction to the extraction station whereby the leading assembly part is separated from the succession of assembly parts and is singled at the singling station while being laterally and vertically guided in alignment with the succession of assembly parts.

According to another aspect of the invention, an apparatus for carrying out this method comprises a guiding track laterally and vertically guiding the succession of assembly parts at portions thereof for aligning the assembly parts and means for subjecting the aligned assembly parts in the guiding track to a conveying force to convey the aligned assembly parts in a conveying direction along the guiding track to a singling station at an end of the guiding track. Means is provided for retaining a respective aligned assembly part immediately trailing a leading assembly part at the singling station and for grasping the leading assembly part by the end of the guiding track at the portion thereof which is laterally and vertically guided. Further means is provided for moving the grasped, vertically and laterally guided assembly part away from the retained assembly part in the conveying direction to the extraction station whereby the leading assembly part is separated from the succession of assembly parts and is singled at the singling station while being laterally and vertically guided in alignment with the succession of assembly parts.

This method and apparatus make it possible to obtain a simple and troublefree separation of a single assembly part from the following assembly parts. Because the assembly part is grasped in its aligned and guided position, that is to say is fixed in its position with respect to a gripper device or the like, and is removed at the same time from the following assembly parts in the direction of displacement of these following assembly parts, burrs, protrusions or other faults on assembly parts cannot obstruct its extraction. If this burr had impeded the conveying of the assembly parts in the conveying direction, this assembly part would already have been ejected in the course of the preceding conveying path. Furthermore, a separation of the assembly part which is to be extracted from the immediately following assembly part is possible in simple manner without damage to the assembly parts even if these adhere to each other, for example because of electrical forces or adhesion, since the assembly part which is to be extracted is withdrawn from the following immobilized assembly part in the conveying direction. At the same time, this withdrawal is possible only because the assembly part which is to be extracted is grasped and may thus be acted upon by a conveying force or a withdrawing force or freeing force.

According to another feature, it is also possible for the assembly parts to be pushed by other assembly parts acted upon by a conveying force into a singling and extraction area, and for the assembly part directly adjacent the assembly part to be extracted in a direction opposite the conveying direction to be immobilized against a displacement in the conveying direction and the assembly part to be extracted to be grasped in a section of a guiding track along which it is guided to the extraction point, and for the same to be placed in a turned or pivoted position with respect to the extraction point, preferably in a section of preparation for extraction by means of a gripper device. This solution renders it possible for the extraction section to be kept free of vibratory displacements or the like acting directly on the same, since the assembly parts which are to be extracted are pushed into the extraction position by the following assembly parts. Another advantage of this solution is apparent in that the assembly part which is to be extracted is grasped in the sections in which it is guided in the guiding track to the extraction point, so that the transfer or arrival of the assembly parts in the extraction position or the gripper device is not obstructed. Furthermore, failures in the extraction of the assembly parts are prevented, since these are guided perfectly as far as the extraction point, in the sections in which they are grasped. It is advantageous moreover that the assembly parts may be placed in particular rotated or pivoted positions with respect to their infeed position by means of this intermediate conveying track extending between the guiding track and the gripper device for fitting the assembly parts, so that the assembly parts present in correct position in the preparation section may be placed on workpieces or workpiece carries by means of the gripper device in extremely short cyclic periods.

It is also possible moreover that the assembly part may be examined and/or tested between the extraction point and/or at the preparation section, so that this intermediate conveying path may at the same time also be utilized to check or test the assembly parts, so that wrong, incorrect or faulty assembly parts may be separated out almost without the loss of working time and that the feed of such assembly parts into the fitting position on the workpiece or workpiece carrier is prevented.

It is also advantageous if the already aligned assembly parts are stored in a section of the conveying device before the extraction point and that the assembly parts are previously singled and aligned in a separate section of the conveying device, since other assembly parts are immediately available for extraction by this means during the separation of faulty or damaged assembly parts in the course of checking operations. In this connection, it is also advantageous that the guiding track for singling and aligning the assembly parts is separate or independently operated from the section in which these are stored, since in the case of a sufficiently large stock of the assembly parts in the storage section, the feed device preceding a guiding track for the singling and aligning operation, and the vibratory drive and the like allocated to this guiding track may be stopped.

According to another modified form of the inventive method, it is also possible that the assembly parts may be conveyed by vibratory action over aligning and singling devices and stored in a following section of the guiding track independently affected by vibratory action, and that the assembly parts situated closest to the extraction point are pushed by these vibrating assembly parts on to a stationary guiding track which comprises several guiding track sections which may be displaced with respect to each other and in particular in the conveying direction of the assembly parts and are constructed for grasping the same, and that the assembly part directly in front of the displaceable guiding track section is immobilized during the grasping of the last assembly part and its extraction. The conveying force may thereby be adapted to the varied conditions in the section of the guiding track in which the assembly parts are singled and aligned and in that in which they are conveyed and stored. The transfer of the assembly parts to the guiding track sections for the grasping of the assembly parts is thereby facilitated.

It is also possible that the extracted assembly part may be turned and/or pivoted into a required discharge position between the extraction point and the preparation section. It is possible thereby to place the assembly part in a predetermined position in a preparation section, so that particular dimensions and tolerances may be checked in this preparation section.

It is also advantageous if the gripper device is placed between two stops allocated to the gripper jaws in the extraction position when the gripper jaws are in the closed position, if the gripper jaws are then opened and in contact with the stops are held in an intermediate position between the closed and open position, whereupon an assembly part is fed to a guiding track section of the gripper device arranged in the gripper jaws, the next assembly part is held fast, the gripper jaws are moved into their closed position, the assembly part is grasped and the gripper device is displaced into the preparation section or to the discharge point. The aperture width of the gripper jaws of the gripper devices may thereby be limited even with grippers which have no more than one fully opened or closed terminal position, at an intermediate position in which the gripper jaws are closed to the extent that the assembly part may be inserted between the gripper jaws, whereupon it is grasped in the sections located by the gripper jaws. In this case, the gripper jaws may be formed as a part of the guiding track.

In the apparatus of the invention, the grasping means comprises the end of the guiding track and this guiding track end has a structure substantially corresponding to the cross-sectional shape of the guiding track, as well as a device for immobilizing the assembly parts, and, in an extraction position, the guiding track sections situated on the extraction and singling device are constructed and/or arranged approximately congruently with respect to the guiding track sections of the preceding guiding track. The extraction and singling device is arranged to be movable in the conveying direction of the assembly parts with respect to the preceding guiding track by means of a drive. The surprising advantage of the inventive structure of the apparatus consists in that thanks to the guiding track section constructed and/or arranged congruently with respect to the preceding guiding track in the extraction position in combination with the incorporation of an immobilizing device which is displaceable in the longitudinal direction of the guiding track, the last assembly part may be withdrawn without trouble in the conveying direction and fed onward for further processing.

According to a modified form of the inventive apparatus, a checking device for the assembly parts or different conveying paths for the assembly parts are allocated to the extraction and singling device at the extraction and/or discharge position and/or in an intermediately situated preparation section. The checking device prevents assembly parts having incorrect dimensions, which would result in faulty or inferior products, from escaping rejection. Since the extraction device has a preparation section along an intermediate conveying path between the extraction and delivery positions, it is also possible depending on the result of inspection of the assembly parts, to feed these to different conveying paths for further processing or for ejection of faulty parts or for corrective processing and the like.

According to the invention, the extraction and singling apparatus may be multisectional in structure and comprises one fixed guiding track section and one displaceable guiding track section coupled to a drive, the extraction and singling device preferably being supported independently of a guiding track preceding the same and vibrated by a vibratory drive. The area of transition between the different guiding track sections may thereby be adjusted and established precisely. Furthermore, the transfer of the assembly parts is then facilitated further if the singling and extraction device is mounted independently of the vibrated guiding track.

The displaceable guiding track section may be mounted in a carriage which is displaceably guided on a guiding post extending parallel to the conveying direction of the assembly parts and is coupled to a drive, thereby assuring a smooth and precise guiding of the guiding track sections displaceable with respect to each other.

According to another embodiment of the inventive apparatus, the displaceable guiding track section is pivotably mounted—preferably within the carriage—around a shaft extending at right angles to the conveying plane and/or transversely to the conveying direction of the assembly parts, and is coupled to a rotational or pivotal drive. The longitudinal displacement in the conveying direction of the assembly parts may thereby occur at the same time as a possible pivotal or rotational displacement.

It is also advantageous if the displaceable guiding track section is situated in the terminal portion of a bracket or cantilever which has its other terminal portion coupled to the rotational and/or pivotal drive, since the space requirement for simultaneous rotational or pivotal displacement of the assembly parts may thereby be kept small.

According to another modified form of the inventive apparatus, the displaceable guiding track section of the extraction or singling device may be situated on a gripper device which preferably comprises mutually displaceable gripper jaws, which may be moved into an intermediate position between the open and closed positions, whereby the displaceable guiding track section is simultaneously utilizable as a gripper device. Furthermore, this intermediate position renders it possible for the assembly part to run into the displaceable guiding track section without obstruction.

It is also advantageous if the gripper jaws are mounted in a bearer head adjacent a cylindrical housing and which is non-rotatably coupled by connecting devices to a stop plate and/or a clamping device, a seat for a driving element, e.g. a gearwheel and/or a displaceable stop device, preferably being provided in the end of the cylindrical housing facing away from the bearer head. The advantages of an uncomplicated mounting of the cylindrical housing may thereby be combined with the advantages of the non-rotatable mounting.

It is also possible to provide a spring device or system acting on the two gripper jaws in the opening direction and a stop device which is adjustable and determines the closed and/or open position between the two gripper jaws, and to allocate a closing drive aligned at right angles to the direction of displacement of the gripper jaws to the two gripper jaws. The operation of a drive is consequently needed only during the period in which an assembly part is held by the gripper jaws.

It is also advantageous in this connection if the gripper jaws are transversely displaceable to the conveying direction of the assembly parts and that these have allocated to them stops which limit their opening displacement in the extraction position and are adjustable, since an intermediate position of the gripper jaws is thereby possible without additional complexity of control.

It is advantageous if the gripper jaws of the gripper device have a mounting for gripper inserts and are pivotally arranged around shafts extending parallel to each other, a spreader mandrel being allocated to the extremities of the gripper jaws opposed to the mountings, which is coupled to a closing drive, e.g. a piston/cylinder system, so that a universal application of the gripper device may be possible for the most diverse assembly parts, and only the gripper inserts need be matched to the individual parts or guiding track.

The driving unit, e.g. the gearwheel, may mesh with another gearwheel of a rotational drive, e.g. a rotary cylinder, which is installed on a carrying plate which is secured on a bearing block carrying the cylindrical housing, to provide a direct transmission between the gripper device and the rotary cylinder.

According to another modified form of the inventive apparatus, guiding members for stop blocks allocated to the gripper device may be provided on the bearing block, whereby the bearing block may be co-opted at the same time for mounting the stop elements and for setting the terminal positions of the pivotal displacement.

Furthermore, the gripper jaws and/or the gripper inserts or the adjustable stop blocks and the like may also have allocated to them dynamic pressure sensor or pickup devices, whereby it is possible to monitor the individual positions of the gripper device and, independently therefrom, also the presence of the assembly parts.

The clamping device may, in a direction at right angles to the receiving opening of the cylindrical housing of the gripper device, have approximately the same cross-sectional shape as the end side of the bearer head of the gripper device turned towards the clamping device and with the optional interposition of a stop plate, may have a connecting element approximately corresponding to the external dimensions of the bearer head placed adjacently to a cylindrical housing, which substantially corresponds to the cylindrical housing of the gripper device and which is mounted in a bearing element for receiving this cylindrical housing, whereof the external dimensions substantially correspond to the bearing block for the rotational drive allocated thereto, whereby the most diverse sequences of motion are possible from the guiding track to a delivery position along this intermediate conveying path of the assembly parts under application of a plurality of identical components.

Finally, one end side of the clamping device and/or the bearing element or block may be formed to receive mounting plates for securing ducts, and the bearing element or block may be mounted on a carrier plate having a unitary pattern of bores, to which are allocated matching bores in a fastening plate of a handling system, thereby substantially facilitating the provision of supply lines for drives, sensor units and the like, and averting an obstruction of the gripper device by these lines during the rotational, pivotal or motional displacements.

BRIEF DESCRIPTION OF THE DRAWINGS

The invention will now be described, by way of example, with reference to the accompanying partly diagrammatic drawings, in which.

DETAILED DESCRIPTION OF THE PREFERRED EMBODIMENT

Figure 1:
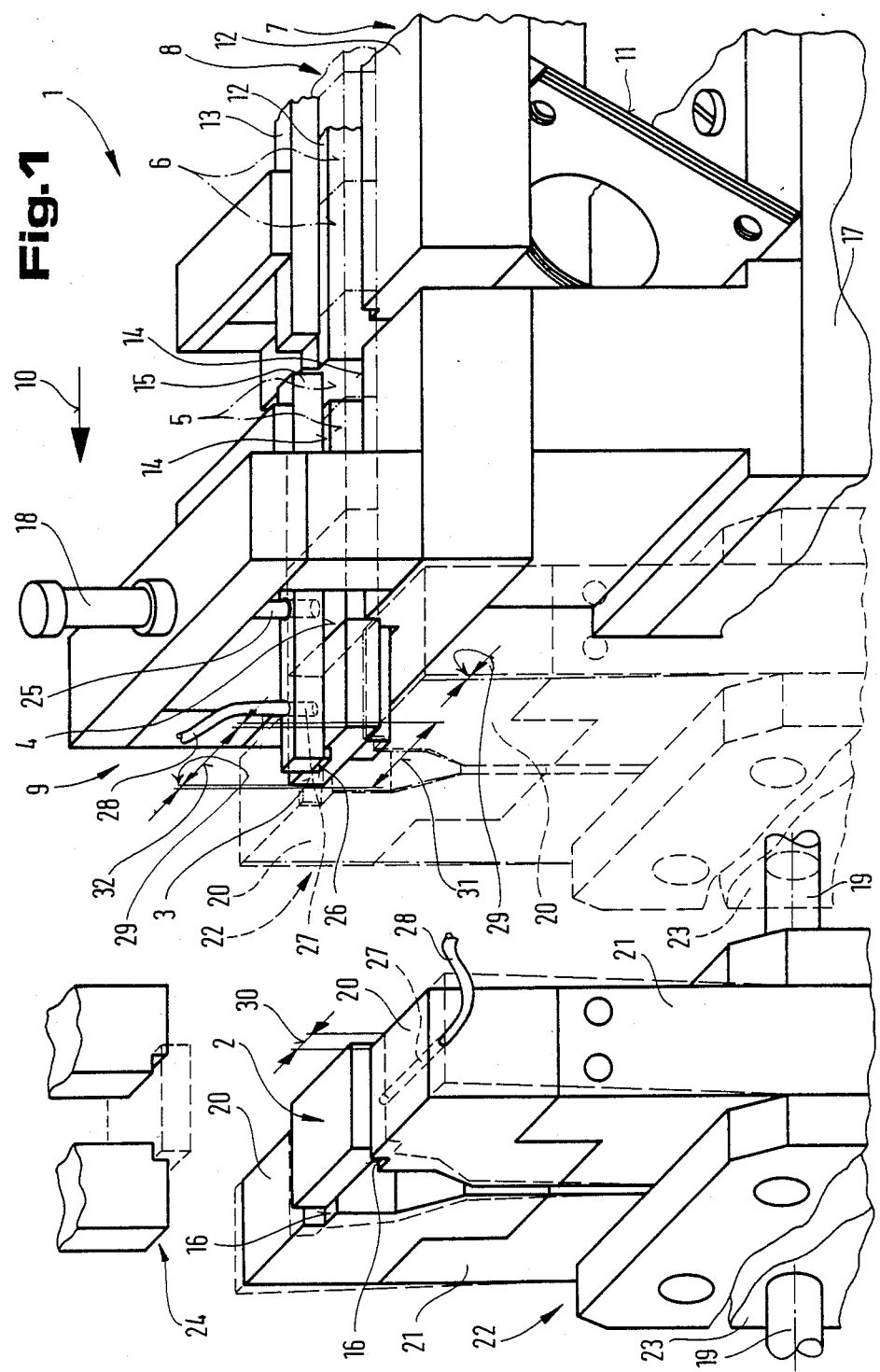
FIG. 1 is a fragmentary perspective view of an apparatus for infeed and individual extraction of assembly parts in the region of a singling and extracting device.

FIG. 1 illustrates an apparatus 1 for supplying and extracting assembly parts 2 to 6. The assembly parts 2 to 6 are all identically constructed but are tagged with different reference numerals to allow for a simpler description of the sequence of the method according to the invention. The apparatus comprises a conveyor device 7 with a guiding track 8 for the assembly parts 2 to 6. The conveyor device 7 is placed behind an extracting and singling device 9 in the conveying direction indicated by arrow 10. The conveying of the assembly parts 2 to 6 in the conveying direction along the guiding track 8 is effected by vibratory drive 11 indicated diagrammatically, which may incorporate an electromagnet as an oscillation generator.

Guiding track sections 12 laterally and vertically guide assembly parts 6 along guiding track 8, and additional guiding track section 13 retains the assembly parts 6 to prevent them from travelling upwards along the vertical guiding walls of the guiding track sections 12 and jumping out of the guiding track or being piled one over another. The extraction and singling device 9 comprises fixed guiding track sections 14 and 15 which substantially correspond in function to guiding track sections 12 and 13, and displaceable guiding track sections 16 whose operation corresponds to that of the guiding track sections 12, 14 and which are displaceable in the conveying direction 10 with respect to the guiding track sections 14. The guiding track sections 14 and 15 are supported fixedly on a base plate 17 which also carries the vibratory drive 11.

The advance of the assembly parts 5 guided by means of the guiding track sections 14 and 15 is effected by assembly parts 6 which are subjected to the vibratory feed displacement along guiding track 8 and which push the assembly parts 5 forward so far along the stationary guiding track sections 14 and 15 that they occupy the position of the assembly part denoted by 4 in the drawing. At the extraction and singling device 9, the assembly part marked 4 is immobilized against an advance in the conveying direction 10 by means of a device 18 for retaining the assembly parts. The displaceable guiding track section 16 is displaceable along a guiding post 19 extending parallel to the conveying direction 10. The guiding track sections 16 are arranged in gripper inserts 20 of reciprocally displaceable gripper jaws 21 of a gripper device 22. The gripper device 22 is mounted in a carriage 23 displaceable along the guiding posts 19 and thus in the conveying direction 10 of the assembly parts 2 to 6. The carriage 23 may be moved from the extraction position for the assembly part 2 shown by solid lines, in which the part may be extracted, for example by means of a gripper device 24 of a handling system, and installed on a workpiece, into the position shown by dash-dotted lines in which the guiding track sections 16 are in alignment with, and adjacent to, the guiding track sections 14.

If the gripper device 22 is in the position shown by dash-dotted lines, in which the displaceable guiding track sections 16 are aligned with, and adjacent to, the stationary guiding track sections 14, a plunger 25 of the device 18 intended for retaining the assembly part 4 is raised so that this assembly part 4 is conveyed by assembly parts 6 subjected to the propulsive or feed force of the vibrator drive 11 into the extraction position, and is then situated in the position of the assembly part 3 shown by solid lines. The extent of the feed displacement of the leading assembly part is limited by a stop 26. By way of example, stop 26 is illustrated as being arranged on guiding track section 15, in which case stop 26 is retractible like plunger 25, for example, or is upwardly pivotal with respect to guiding track section 15 to permit carriage 23 with assembly part 3 to be moved from the singling station indicated in phantom lines in FIG. 1 into the extraction position shown in full lines. Alternatively, stop 26 may be mounted on the front face of one of the gripper inserts 20 in the conveyance path of the assembly parts. It would also be possible to separate an end of guiding track section 15 from a fixed portion of this guiding track section and to mount this guiding track section end on one of the gripper inserts by a bracket in the same manner as the fixed guiding track section portion is fixedly supported on base plate 17. In this manner, the guiding track section end with stop 26 is displaceable with gripper device 22 between the singling and extraction stations.

As apparent from the position of the gripper jaws 21 and the gripper inserts 20 in the extraction position of the gripper device 22, the gripper inserts 20 are at a slightly opened setting, so that the assembly part may be pushed into contact with stop 26 by the action of the following assembly parts 6. A nozzle 27 connected to conduit 28 may be arranged in the area of the extraction point of the assembly part 3, for example in the guiding track section 15. It is thus possible to ascertain, by means of a dynamic pressure pickup device, whether the assembly part 3 is present at the extraction point, in which case the gripper jaws 21 are moved towards each other and thereby grasp the assembly part 3. To this end, a nozzle 27 again connected to conduit 28 with a dynamic pressure pickup device may equally be arranged in one of the two gripper inserts 20 to ascertain whether the assembly part has been grasped reliably. The position of the gripper inserts 20 is shown by dash-dotted lines in the extraction position of the gripper device 22, and by solid lines in the delivery position. When the assembly part 2 is grasped by the gripper device 24, the gripper inserts 20 or rather the gripper jaws 21 are moved apart to the position dash-dotted in the delivery position and the assembly part may be placed into its assembling position by gripper device 24. As apparent from distance 29 between the broken-line and dash-dotted positions of the gripper inserts 20 in the area of the extraction position of the gripper device 22 and from distance 30 between the positions shown by solid and broken lines of the gripper inserts 20 in the area of the delivery position of the gripper device 22 shown by solid lines, the distance 30 between the closed and open positions of the gripper inserts 20 is substantially greater than the distance 29 between the intermediate position of the gripper inserts 20 shown in the area of the extraction position and their position in contact with the assembly parts 2 to 6. This different aperture width between the gripper inserts 20 is provided so that the extraction of the assembly parts 2 by the gripper device 24 may not be hindered, whereas in the area of the extraction position of the gripper device 22—position shown by broken lines—the gripper inserts 20 should be opened just so far that the assembly parts 2 to 6 may run into the guiding track sections 16 without obstruction. It should be assured in this connection that the guiding track sections 16 are so close to each other that the assembly parts 2 to 6 are guided vertically as well as laterally. This is secured in the present embodiment by means of an intermediate position of the gripper jaws 21 and of the gripper inserts 20.

The operation of the inventive method will be described hereinafter in connection with the above described extraction and singling device 9.

The assembly parts 2 to 6 are conveyed along the guiding track 8 in the direction of the extraction and singling device by the vibratory conveying motion generated by vibratory drive 11. To this end, the assembly parts 2 to 6 are pushed forward on to the stationary guiding track sections 14 and 16 by the feed force exerted on these assembly parts 6. At this instant, the gripper device 22 is situated in the extraction position—broken-line illustration—in which the guiding track sections 16 are aligned with the guiding track sections 14. The opposed and parallel vertical surfaces of the guiding track sections 14 and 16, respectively, have a greater spacing 31 than a length 32 of the assembly parts 2 to 6, i.e. the gripper jaws 21 and gripper inserts 20 are situated between the open and closed positions. Under the pressure of the following assembly parts 6 to 4, the assembly parts are pushed forward in the area of the guiding track sections 14 and 16 until an assembly part 3 bears against the stop 26. If the presence of the assembly part 3 is detected via the nozzle 27 by means of a dynamic pressure pickup device, the gripper inserts 20 and gripper jaws 21 are moved to the closed position and the assembly part 3 is grasped. At the same time, the plunger 25 of the device 18 for retention of the following assembly parts 4 is extended and thrust against the assembly part 4, so that the latter is immobilized in its position with respect to the guiding track sections 14 and 15.

As clearly apparent from the drawing, the guiding track section 15 extends out of the area in which the assembly part 4 is positioned and into the area of the extraction position of the gripper inserts 20. In the same way, a lower guiding track section may project beyond the extremity of the stationary guiding track sections 14, which section provides support from below and between the gripper inserts 20 for the assembly part 3 to prevent dropping off of the assembly part 3, for example under powerful vibrations or knocks on an assembling machine or in case of other environmental factors. It is to be understood that an assembly part can enter the position in which the assembly part 3 is situated in the drawing only if the gripper inserts 20 are in the position shown by broken lines. By extending the guiding track section 15 beyond the extremity of the guiding track sections 14 in the direction of the guiding track sections 16, as well as possibly the guiding track sections complementarily provided below the assembly parts, it is assured that only such assembly parts as are in the required position may run into the gripper device 22.

After this, stop 26 is retracted and the assembly part 3 is moved away from the assembly part 4 by a displacement of the gripper device 22 together with the carriage 23 along the guiding posts 19 in the conveying direction 10 to the position shown by solid lines in FIG. 1. It is possible in this position to check on the dimensions of the assembly part or to grasp the assembly part 2 by gripper device 24 of a handling system and to carry the same to an assembling or depositing position. The inventive method primarily has the advantage of preventing the extraction of the assembly parts from being obstructed by burrs or flash projecting into engagement with the next assembly part, since the assembly part 3 is displaced in the conveying direction 10 and burrs of the assembly part 4 projecting in the direction of the assembly part 3 cannot obstruct this extractive displacement. At the same time, it is assured by the grasping of the assembly part carried from the extraction position to the delivery position that its position is determined with respect to the gripper device 22 and that this does not change upon removal of the next assembly part 4, and that the assembly part cannot drop off, even if the same adheres because of oil residues, adhesion or electromagnetic forces.

Figure 2:
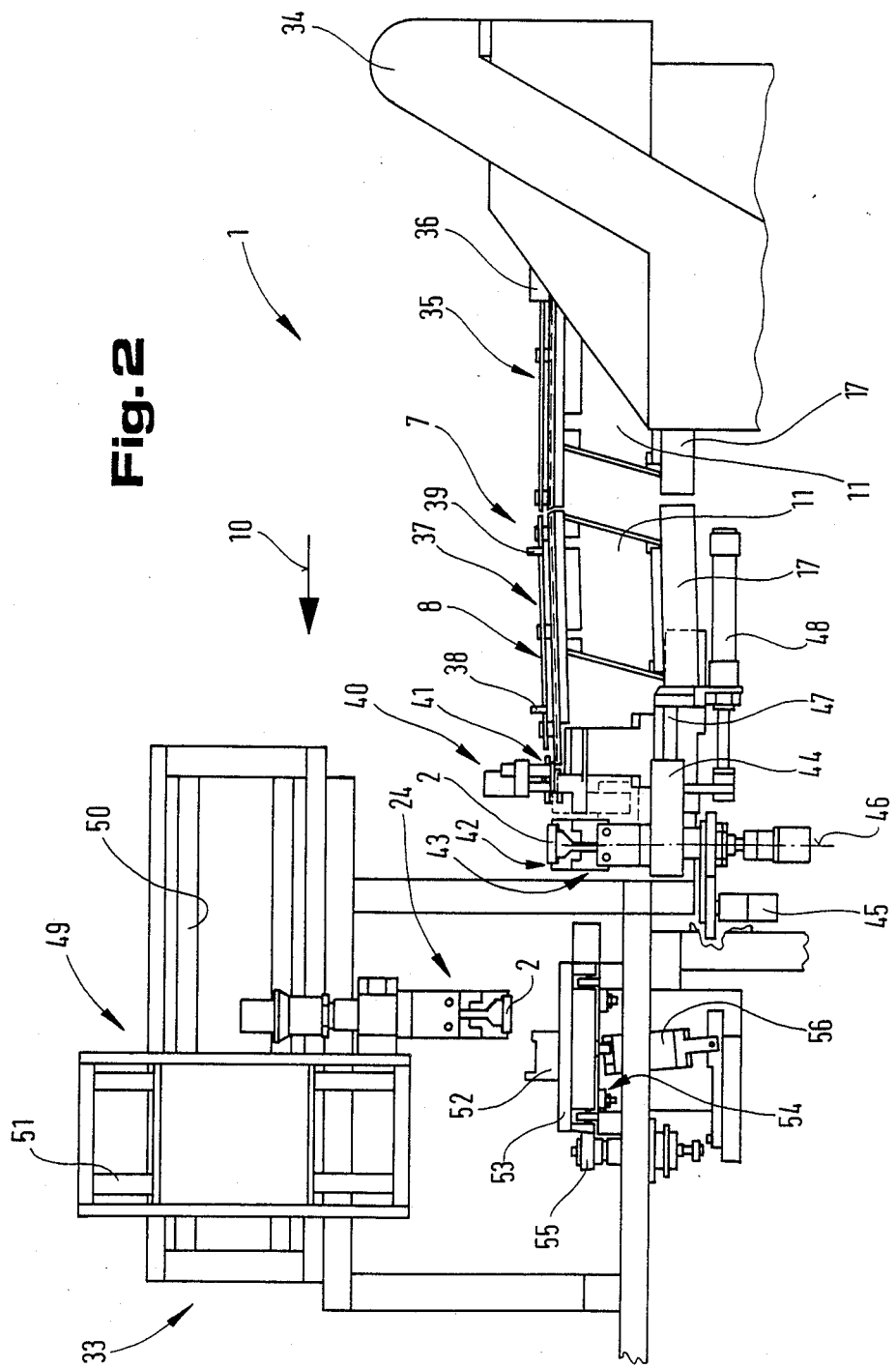
FIG. 2 is an elevation of an apparatus for infeed and individual extraction of assembly parts in a machine plant for aligning and singling heaped assembly parts, and fitting the parts on workpieces on workpiece carriers.

FIG. 2 illustrates a part of a fully automatic assembling machine 33 as well as apparatus 1 for supplying and extracting assembly parts 2. The apparatus comprises a conveyor system 34 whereby assembly parts 2 are extracted from an unsorted quantity in a bin and supplied to a following conveyor device 7. This conveyor device 7 comprises a section 35 in which aligning and separating devices 36 place the assembly parts 2 in a row in which all the assembly parts 2 are placed in a predetermined position. The assembly parts 2 conveyed thereto are stored in a section 37, sensor elements 38, 39 being provided along the guiding track 8 which detect a minimum filling level or maximum filling level along the section 37 of the conveyor device 7. If the section 37 of the conveyor device 7 is loaded up to the sensor unit 39 with assembly parts 2, the continued conveying of assembly parts by means of the conveyor system 34 and the aligning and singling of the assembly parts 2 in the section 37 of the conveyor device 7 may be interrupted by the sensor unit 39. If the stock drops below the minimum filling level monitored by means of the sensor unit 38, the aforesaid devices may be turned on again to convey additional assembly parts 2 in the aligned position required. The sections 35 and 37 of the conveyor device 7 are supported separately on base plates 17 mounted on vibratory drives 11. An extraction and singling device 40 is provided on the base plate 17 which also carries the vibratory drive 11 of the section 37 of the conveyor device 7. Said device is supported directly on the base plate 17 and comprises a stationary guiding track section 41 and a displaceable guiding track section 42. The displaceable guiding track section 42 is arranged on a gripper device 43. The gripper device 43 is rotatable in a carriage 44 by means of a rotating drive 45 about a longitudinal axis 46 of the gripper device 43. The carriage may be displaced moreover along guiding posts 47 by means of a drive 48 in the conveying direction 10 of the assembly parts 2 and may consequently be displaced from the position shown by broken lines in which the guiding track sections 41 and 42 are aligned, into the position of the gripper device 43 shown by solid lines. At the same time, the gripper device 43 may be turned around the longitudinal axis 46 into different angular settings, by means of the rotational drive 45.

The assembly part 2 shown in the gripper device 3 may be withdrawn from the gripper device 43 at the delivery position by means of another gripper device 24 which is part of a handling system 49. The assembly part 2 may be deposited or installed on a workpiece 52 by means of this gripper device 24 which is displaceable along guiding posts 50, 51 by means of the handling system 49 along at least two axes at right angles to each other. The workpiece 52 for its part is fastened on a workpiece carrier 53 which may be moved in forward direction along a guiding device 54 by means of roller drives 55. A device 56 is provided to stop and position the workpiece carriers 53 in the area of the handling system 49. The structure of the guiding device 54 as well as of the roller drive 55, which are installed on machine tables of an assembling machine 33 comprising several such machine tables, may correspond to that disclosed in my U.S. Pat. Nos. 4,492,297, 4,530,287, or 4,619,205.

As apparent from the simplified and diagrammatical illustration of the gripper devices 43 and 24, these gripper devices may substantially be analogously constructed, so that it is possible to manage with a plurality of analogous parts or identical structural assemblies for a complex assembling machine of this nature.

Figure 3:
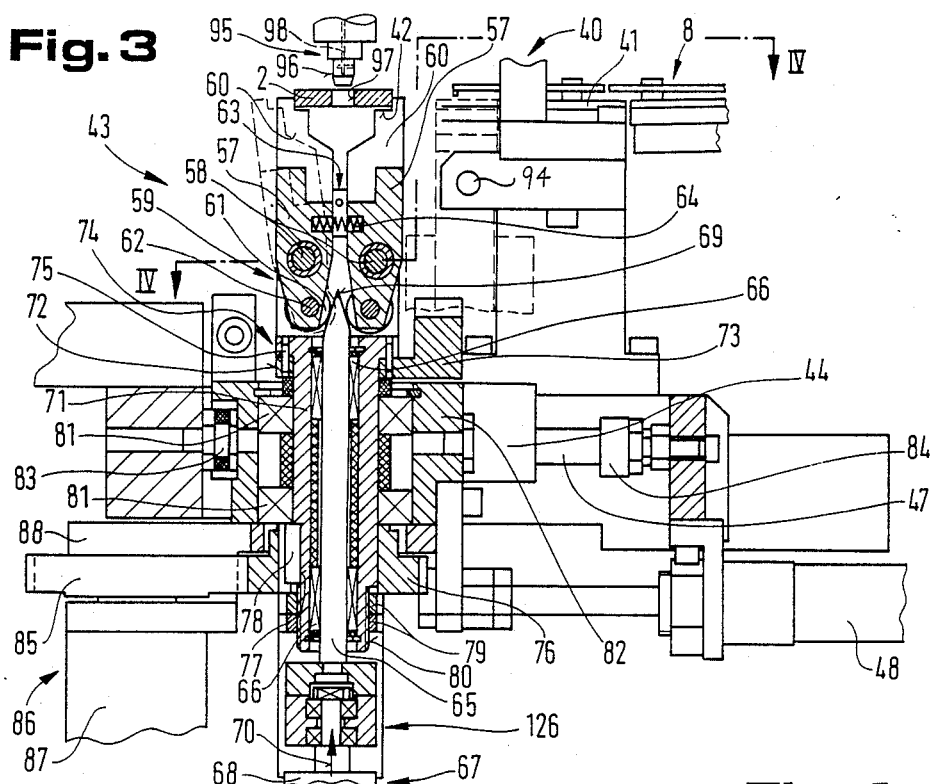
FIG. 3 is a partly sectional side view of an apparatus for supplying and individually extracting assembly parts, with a gripper device in a preparation section and a checking device allocated to the assembly parts in this preparation section, taken along lines III—III in FIG. 4.

The extraction and singling apparatus 40 is illustrated on an enlarged scale in FIG. 3. The gripper device 43 is in its delivery position turned through 90° with respect to the extraction position. Reciprocally displaceable gripper jaws 57 are rotatably mounted on parallel shafts 58 which are supported in a bearer head 59. For grasping and holding the assembly parts 2, the gripper jaws 57 have gripper inserts 60 secured therein, the shape of the inserts being adapted to the appropriate outer profile of the assembly parts 2 and to the structure of the preceding guiding track 8. Support rollers 62 rotatably journalled on pivot shafts 62 secured in the gripper jaws 57 are arranged in the ends of the gripper jaws 57 opposite to the gripper inserts 60. A spring system 63 comprising a compression spring 64 is arranged between the shafts 58 and the gripper inserts 60. The action of this compression spring 64 forces the gripper jaws 57 against the action of a spreader mandrel 65 in the direction of the open position shown by broken lines. If an assembly part 2 is to be grasped or held, the spreader mandrel 65 is pushed within ball-bearing guides 66 by drive 67, for example a piston/cylinder system 68, in the direction of the gripper jaws 57. Thanks to the oblique surfaces 69 provided in the terminal portion of the spreader mandrel 65—the extremity of the spreader mandrel 65 facing towards the gripper jaws 57 may preferably be constructed conically—, the two support rollers 61 are pressed apart transversely to the feed direction—arrow 70—and the gripper jaws 57 together with the gripper inserts 60 are thrust against each other against the action of the compression spring 64 into the position shown by solid lines, so that the assembly part 2 is grasped.

The ball-bearing guides 66 for the spreader mandrel 65 are secured in a cylindrical housing 71 adjacent to the bearer head 59. The two ball-bearing guides 66 are spaced apart by means of a spacing sleeve and positioned in longitudinal direction in an internal bore of the cylindrical housing 71 by securing rings. The end side of the bearer head 59 facing towards the cylindrical housing 71 has a stop plate 72 carrying a stop 73 whose operation will be described below with reference to FIG. 4. The stop plate 72 is non-rotatably coupled to the bearer head 59 by means of a connecting device 74, for example a set pin 75.

The cylindrical housing 71 has its terminal portion facing away from the bearer head 59 formed to receive a driving member, e.g. a gearwheel 76. Analogously, it is also possible however to provide a belt or toothed belt pulley. A groove 77 into which a key 78 is inserted for playfree corotational connection between the gearwheel 76 and the cylindrical housing 71 is provided as a coupling element in the cylindrical housing 71. The positioning of the gearwheel 76 in the longitudinal direction of the cylindrical housing—arrow 70—is performed by means of locking nuts 79 which are borne on an external screw-thread 80 of the cylindrical housing 71. Above the gearwheel 76 is positioned an inner ring of a roller bearing 81 and a spacing sleeve positions the inner ring of another roller bearing 81 on the cylindrical housing 71, a spacing sleeve being interposed between the other roller bearing and stop plate 72. The outer rings of the roller bearings 81 are housed in a bearing block 82 secured on the carriage 44 which is displaceable along guiding posts 47 in the longitudinal direction of the guiding track 8. A drive 48 is coupled to the carriage 44 for displacing the carriage 44 along the guiding posts 47. The delivery position of the gripper device 43 is adjustably set by means of a stop 83 and the extraction position by means of a stop 84, each stop being adjustably arranged in the area of the guiding posts 47 in the displacement path of the carriage 44. For the purpose of turning the cylindrical housing 71 and the bearer head 59 with the gripper jaws 57 holding the assembly part 2 from the extraction position shown by broken lines in the area of the stationary guiding track sections 41 of the extraction and singling device 40 into the delivery position shown by solid lines, the gearwheel 76 meshes with another gearwheel 85 of a rotational drive 86 which is formed by a rotary cylinder 87 in the present embodiment. The rotary cylinder 87 is secured on a bearer plate 88 mounted on the bearing block 82.

Figure 4:
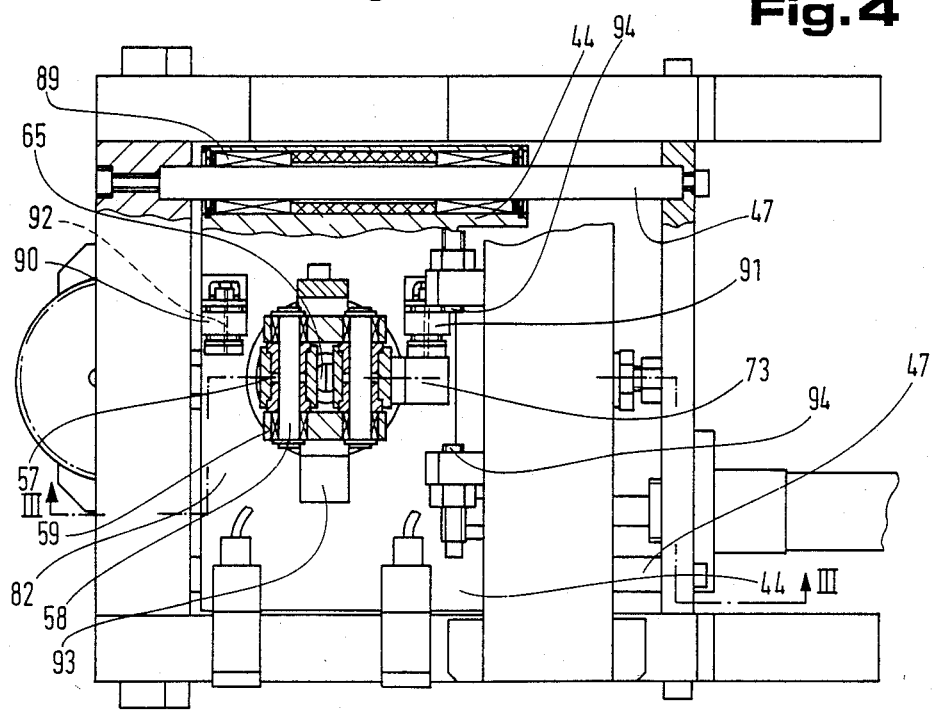
FIG. 4 is a partly sectional plan view of the apparatus, taken along lines IV—IV in FIG. 3.

As more clearly apparent from FIG. 4, the bearing block 82 and the carriage 44 are constructed in one piece and guided by ball-bearing guides 89 on two parallel guiding posts 47. Adjustable stop blocks 90 and 91 are arranged on the bearing block 82. To set the rotational position of the cylindrical housing 71 at the terminal position facing towards the stationary guiding track sections 41, a stop 93 is allocated to the stop block 90, and the stop 73 is allocated to the stop block 91. If a stop 73 or 93 then bears on one of the stop blocks 90 or 91 respectively, it is possible to monitor the momentary position of the gripper device 43 through the bore 92 in respective stop block 90, 91 to which a dynamic pressure sensor device is connected. The mounting of the shafts 58 in the bearer head 59 and the gripper jaws 57 is more clearly apparent from this illustration. It is also apparent that the spreader mandrel 65 has its terminal portion facing towards the bearing rollers 61 formed in roof-like manner.

Stops 94 facing towards the stationary guiding track sections 41, which for example are formed by adjustably installed screw-threaded pins secured by lock nuts and comprising internal bores, serve the purpose of holding the gripper jaws 57 and the gripper inserts 60 in an intermediate position between the open and closed positions when the spreader mandrel 65 is retracted. In this position, the gripper inserts 60 with the guiding track sections 42 will display a slightly larger gap than the dimension of the assembly parts 2 so that the assembly parts 2 may reliably be pushed into the gripper device 43 by the following assembly parts. The contact between the gripper jaws 57 and the stops 94 may be monitored by means of the internal bores provided therein and dynamic pressure sensor devices connected thereto.

As also shown in FIG. 3, a checking device 95 may be provided in the area of the extraction position of the gripper device 43 or in a preparation section between the extraction and delivery positions. This checking device 95 comprises a test mandrel 96 for monitoring the caliber of a bore 97 in assembly part 2. A bore 98 is provided in the test mandrel 96 for this purpose, through which the contact of the test mandrel 96 with the bore 97 may be detected by means of a dynamic pressure sensor device. If the bore 97 has too small a diameter, the test mandrel 96 cannot be inserted and a fault signal is consequently transmitted to the extraction and singling device. The same thing happens if the bore 97 has an excessive diameter because no dynamic pressure can then build up between the test mandrel 96 and the bore 97. If a fault signal is generated, the faulty assembly part is fed to a scrap conveyor track and the gripper device 43 is moved back to the extraction position in the area of the guiding track 8 to collect another assembly part. This repeat sequence renders it possible to carry proper assembly parts in rapid sequence to a following gripper device, so that the assembling operation on a fully automatic assembling machine is not interrupted.

Figure 5:
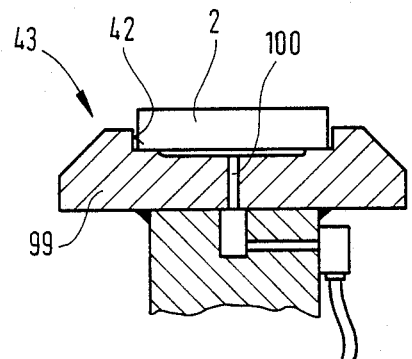
FIG. 5 is a fragmentary sectional side view of a gripper device comprising a suction gripper insert.

FIG. 5 shows that the gripper device 43 may also have a suction gripper insert 99 instead of the gripper jaws 57 wherein the guiding track sections 42 may be arranged. The assembly parts 2 guided in these guiding track sections 42 are then grasped by a vacuum applied through a conduit 100 and held in their position on the gripper device 43. The spreader mandrel 65 in FIG. 3 is then replaced by a connecting rod whereby the suction gripper insert 99 may be placed in or adjusted at different vertical positions.

Figure 7:
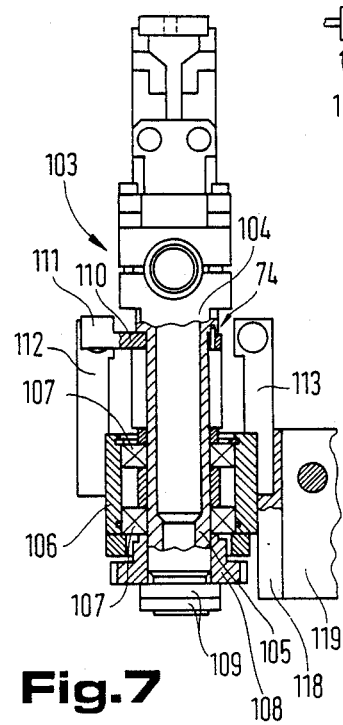
FIG. 7 is a partly sectional view of the apparatus, taken along lines VII—VII of FIG. 6.
Figure 6:
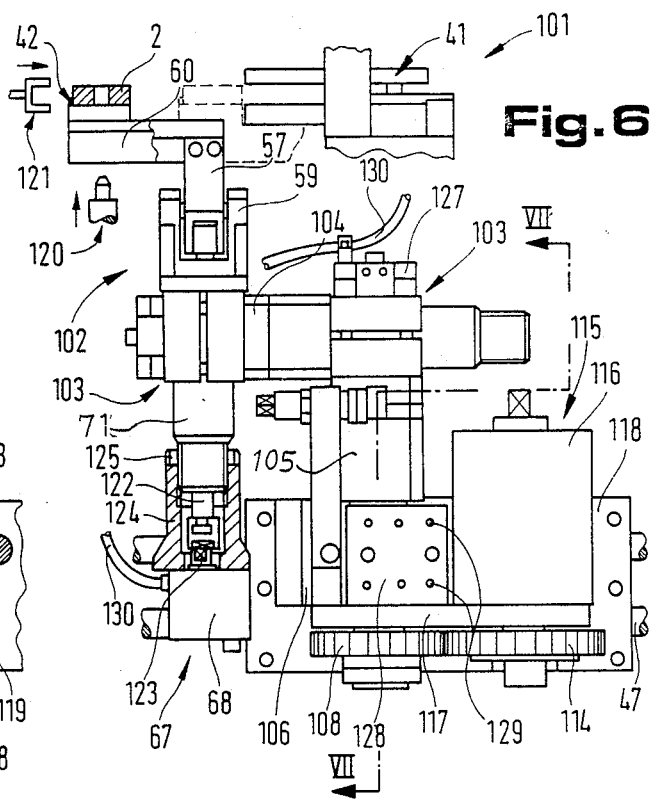
FIG. 6 is a partly sectional elevation of an apparatus for supplying and extracting assembly parts, comprising a gripper device incorporating a bracket or cantilever.
Figure 8:
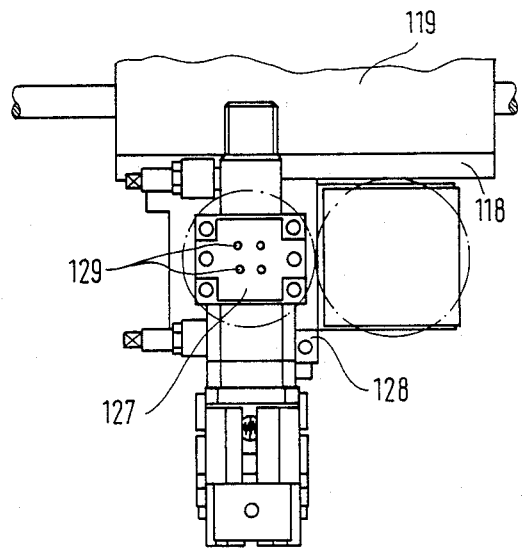
FIG. 8 is a plan view of the apparatus according to FIGS. 6 and 7.

Another modified form for installation of a gripper device 102 allocated to an extraction and singling device 101 is shown in FIGS. 6 to 8. Like the gripper device 43 in FIG. 3, the gripper device 102 comprises a cylindrical housing 71 and bearer head 59 in which the gripper jaws 57 are mounted. The same reference numerals as in FIG. 3 designate identical parts. The actuation of the gripper jaws 57 is performed by a spreader mandrel 122 corresponding to spreader mandrel 65, as described with respect to FIG. 3. The closing drive 67 serves the purpose of actuating the gripper jaws 57. The gripper inserts 60 inserted into the gripper jaws 57 are so constructed however that the stationary guiding track sections 42 for the assembly parts 2 are laterally offset with respect to the longitudinal axis of the cylindrical housing 71.

The cylindrical housing 71 is gripped fast in a clamping device 103 which—in a direction at right angles to the reception opening of the cylindrical housing 71 and under interposition of a connecting element 104 substantially corresponding to the bearer head 59 in its external dimensions —comprises a cylindrical housing 105 which corresponds to the cylindrical housing 71 in its dimensions. This cylindrical housing 105 is clamped in clamping device 103 which is joined to cylindrical housing 105 by the transition element 104, as more clearly apparent from FIG. 7. This cylindrical housing 105 is mounted in a bearing unit 106 by means of roller bearings 107. The positioning of the inner rings or raceways of the roller bearings 107 is effected by a gearwheel 108 which is coupled rotationally with the cylindrical housing by the groove situated in the latter and a key, and is positioned in the longitudinal direction of the cylindrical housing 105 by means of nuts 109. The inner ring of the roller bearings 107 are separated by a spacing sleeve and additional spacers are arranged between the upper roller bearing 107 and a stop plate 110 which is coupled untwistably with the clamping device 103 by a connecting device 74 in accordance with the embodiment described in respect to FIG. 3. A stop 111 situated on this stop plate has allocated to it stop blocks 112, 113 which are installed on the bearing unit 106 in grooves provided for this purpose. As more clearly apparent from FIG. 6, the gearwheel 108 meshes with a gearwheel 114 which is coupled to a pivotal drive 115, which may for example be formed by a rotary cylinder 116. This pivotal drive 115 is situated on a bearer plate 117 which is secured on the bearing unit 106. The gripper device 102 may be displaced on a carriage 119, on which it is mounted by plate 118, in corresponding manner to the carriage 44 in FIG. 2 along guiding posts 47.

Thanks to the eccentric arrangement of the guiding track sections 42 with respect to the central longitudinal axis of the cylindrical housing 71 carrying the gripper jaws 57, and to its eccentric arrangement with respect to the cylindrical housing 105 carrying the gearwheel 108, as more clearly apparent from FIGS. 7 and 8, during a displacement of the carriage 119 along the guiding posts 47 and a simultaneous pivotal displacement by means of the pivotal drive 115, the gripper is moved away from stationary guiding track sections 41 of the extraction and singling device 101 by a small distance only and is freely accessible from the side as well as from above and below. This has the result that, as shown in FIG. 6, it is possible by means of checking devices 120, 121 which comprise a test mandrel or a distance gauge, to determine the thickness of the workpiece simply by means of the test gauge on the checking device 121 and to determine the calibration size or the aligned arrangement of several consecutively arranged bores simply by means of the test mandrel or the checking device 120. Thanks to another pivotal displacement through 90° it is then possible to pivot the assembly parts 2 from the preparation section allocated to the checking devices 120, 121 into an extraction position in which the assembly part may be extracted by means of a following gripper device, for example the gripper device 24 according to FIG. 2, and conveyed onward for further processing. It is essential that this protruding arrangement of the gripper inserts or of the gripper device carrying the gripper inserts is established by means of substantially analogous parts and that it is possible to manage with but few different individual parts.

In the case of the gripper device 102 a spreader mandrel 122 may be suspended in a receiving element coupled to a connecting rod 123 of the closing drive 67, so that it may be coupled rapidly thereto for a uniform displacement in the longitudinal direction of the spreader mandrel 122. The piston/cylinder system 68 forming the closing drive 67 is then screwed by a belllike securing member 124 on the external screw-thread of the cylindrical housing 71 and secured by means of a locknut 125. Depending on the position or fastening point of the bell-shaped securing member 124 on the external screw-thread of the cylindrical housing 71, the stroke of the closing drive 67 and the aperture width of the gripper inserts 60 in their open position may be preset.

In the gripper device 43 according to FIGS. 3 and 4, the spreader mandrel 65 is coupled on the contrary to the connecting rod of the closing drive 67 by freely rotatable coupling 126 so that the rotational displacements of the gripper device 43 are not transmitted to the connecting rod and the piston of the closing drive 67.

It is possible within the scope of the invention to make use of any gripper or holder device for assembly parts of different form instead of the previously described gripper devices or gripper jaws, gripper inserts and the like as well as of the rotational and pivotal drives described in connection therewith. It is thus easily possible to make use of parallel grippers, suction grippers or grippers which retain the assembly parts by other fluid or electrical forces. Furthermore, the inventive method is also applicable to other conveyor devices than the illustrated vibratory guiding tracks. It is thus possible to apply the inventive method to assembly parts which are moved on conveyor belts for example, by intercepting them in a storage section preceding the extraction section and thereafter singling them according to the inventive method.

To assure a troublefree supply to the individual drives of compressed air or vacuum, and uncomplicated connections to the conduits of monitoring units and other systems of the gripper device, the side of connecting element 104 opposite clamping device 103 and bearing unit 106 carries mounting plates 127, 128 provided with bores 129 arranged in a modular grid pattern corresponding to a grid of the fastening parts for electrical and compressed air lines. As shown in FIG. 6, mounting plates 127, 128 enable the ducts 130 to be so led between the rotary and stationary parts that the ducts 130 are not pinched or damaged by the rotation of the machine elements. Furthermore, a neat duct layout and thus rapid repair of damage and simplified servicing are obtained thereby.

What is claimed is:

1. A method of feeding assembly parts to an extraction station and extracting successive ones of said assembly parts at said station, which comprises the steps of
   (a) laterally and vertically guiding a succession of substantially identically dimensioned, rigid assembly parts at portions thereof in a guiding track for aligning the assembly parts and subjecting the aligned assembly parts in the guiding track to a conveying force to convey the aligned assembly parts in a conveying direction along the guiding track to a singling station defining an end of the guiding track,
   (b) retaining a respective one of the aligned assembly parts immediately trailing a leading assembly part at a singling station,
   (c) mechanically clamping the leading assembly part at the portions thereof which are laterally and vertically guided by the end of the guiding track, and
   (d) moving the clamped, vertically and laterally guided assembly part in the conveying direction away from the retained assembly part to the extraction station whereby the leading assembly part is separated from the succession of assembly parts and is singled at the singling station while being vertically and laterally guided.

2. The method of claim 1, wherein the successive assembly parts abut each other and the conveying force to which trailing ones of the abutting assembly parts are subjected pushes a respective leading assembly part in the conveying direction to the singling station.

3. The method of claim 1, further comprising the steps of receiving a heaped supply of said assembly parts, singling and aligning the assembly parts along a first section of the guiding track, storing the singled and aligned assembly parts along a succeeding section of the guiding track, and conveying the singled and aligned assembly parts in succession from the storing section to the singling station.

4. The method of claim 3, wherein the conveying force is a vibratory force exerted upon the guiding track, independent vibratory forces being exerted upon the first and succeeding sections of the guiding track.

5. The method of claim 1, further comprising the steps of releasing the clamped assembly part at the extraction station, moving the released assembly part to a preparation station, and turning the assembly part to a desired position between the extraction and preparation stations.

6. The method of claim 1, wherein the aligned assembly part is clamped at the singling station between a pair of gripper jaws reciprocally displaceable between closed, intermediate and open positions, the gripper jaws defining the end of the guiding track, the pair of gripper jaws is positioned between two stops arranged to engage the gripper jaws upon displacement thereof from the closed to the intermediate position and the gripper jaws are displaced until they engage the two stops, the leading assembly part is conveyed to the guiding track end while the immediately trailing assembly part is retained and the gripper jaws are in the intermediate position, the gripper jaws are displaced until they assume the closed position and grasp the leading assembly part, and the closed gripper jaws with the grasped assembly part are moved in the conveying direction away from the retained assembly part to the extraction station.

7. An apparatus for feeding assembly parts to an extraction station and extracting successive ones of said assembly parts at said station, which comprises
   (a) a guiding track laterally and vertically guiding a succession of substantially identically dimensioned, rigid assembly parts of portions thereof for aligning the assembly parts,
   (b) means for subjecting the succession of aligned assembly parts in the guiding track to a conveying force to convey the aligned assembly parts in a conveying direction along the guiding track to a singling station at an end of the guiding track,
   (c) means for retaining a respective one of the aligned assembly parts immediately trailing a leading assembly parts at the singling station,
   (d) means for mechanically clamping the leading assembly part at the portions thereof which are laterally and vertically guided by the end of the guiding track at the singling station, and
   (e) means for moving the clamped, laterally and vertically guided assembly part in the conveying direction away from the retained assembly part to the extraction station whereby the leading assembly part is separated from the succession of assembly parts and is singled at the singling station while being vertically and laterally guided.

8. The apparatus of claim 7, wherein the clamping means comprises the end of the guiding track, said guiding track end having a cross section substantially corresponding to the cross section of a guiding track section trailing the guiding track end, the trailing guiding track section and the guiding track end being substantially congruent, and the means for moving the clamped assembly part in the conveying direction comprises a drive for moving the guiding track end away from to the trailing guiding track section whereon the immediately trailing assembly part is retained.

9. The apparatus of claim 8, wherein the means for subjecting the succession of assembly parts in the guiding track to a conveying force comprises a vibrating drive for the trailing guiding track section.

10. The apparatus of claim 8, further comprising a carriage for the clamping means with the guiding track end and guiding post means extending parallel to the conveying direction for displaceably guiding the carriage, the drive being coupled to the carriage.

11. The apparatus of claim 10, wherein the clamping means with the guiding track end is pivotally mounted on the carriage, and further comprising a drive coupled to the clamping means for pivoting the same in a direction extending transversely to the conveying direction.

12. The apparatus of claim 11, further comprising a cantilevered arm having an end carrying the clamping means with the guiding track end, an opposite end of the cantilevered arm being coupled to the pivoting drive.

13. The apparatus of claim 8, wherein the clamping means comprises a pair of gripper jaws reciprocally displaceable between closed, intermediate and open positions, the gripper jaws defining the guiding track end.

14. The apparatus of claim 13, further comprising a bearer head for the pair of gripper jaws, a cylindrical housing having one end connected to the bearer head, a holding element and a connecting device non-rotatably connecting the cylindrical housing with the holding element.

15. The apparatus of claim 14, wherein the holding element is a stop plate, and further comprising a drive received in an end of the cylindrical housing opposite the end connected to the bearer head for turning the cylindrical housing.

16. The apparatus of claim 15, wherein the turning drive comprises a first gearwheel non-rotatably connected to the cylindrical housing, a second gearwheel meshing with the first gearwheel and rotatably mounted on a bearer plate, and a bearer block carrying the cylindrical housing, the bearer plate being arranged on the bearer block.

17. The apparatus of claim 16, further comprising stop block means associated with the gripper jaws and guide means for the stop block means arranged on the bearer block.

18. The apparatus of claim 14, wherein the holding element is a clamping device, and further comprising a drive received in an end of the cylindrical housing opposite the end connected to the bearer head for turning the cylindrical housing, the clamping device having substantially the same cross section in a direction extending perpendicularly to the receiving end of the cylindrical housing as the side of the bearer head facing the clamping device and having a connecting part substantially corresponding to the external dimensions of the bearer head, another cylindrical housing connected to the connecting part and corresponding substantially to the first-named cylindrical housing, a bearer unit carrying the other cylindrical housing and corresponding substantially to the external dimensions of the bearer head, and carrier plate for the turning drive mounted on the bearer unit.

19. The apparatus of claim 13, further comprising a spring means arranged between the gripper jaws and biased to displace the gripper jaws into the open position, and further comprising an adjustable stop means arranged to engage the gripper jaws in the open and closed positions, respectively, for setting said positions, and a closing drive for displacing the gripper jaws into the closed position, the closing drive being arranged perpendicularly to the direction of displacement of the gripper jaws.

20. The apparatus of claim 13, wherein the gripper jaws are displaceable in a direction extending transversely to the conveying direction of the assembly parts, and further comprising adjustable stop means at the singling station for delimiting the positions of the gripper jaws.

21. The apparatus of claim 13, wherein the gripper jaws carry gripper inserts at one end thereof, the gripper inserts defining the guiding track end, the gripper jaws are pivotal about parallel axes, and further comprising a spreader mandrel associated with the ends of the gripper jaws opposite to the one ends for spreading the opposite gripper jaw ends apart, and a closing drive coupled to the spreader mandrel.

22. The apparatus of claim 7, further comprising testing means for monitoring the clamped assembly parts to determine faulty parts.

23. The apparatus of claim 22, wherein the testing means comprises compressed air conduits, and further comprising mounting plates on the bearer head and the bearer block for connections attaching the test conduits thereto, a carrier plate for the bearer head and for the bearer unit, and each of the carrier plates having a grid pattern of bores corresponding to a pattern of the connections.

* * * * *